US 6,595,369 B2
United States Patent
Paulson
Patent No.: US 6,595,369 B2
Date of Patent: Jul. 22, 2003

(54) PARTICULATE MATERIAL DEDUSTING APPARATUS

(76) Inventor: Jerome I. Paulson, 26 Creek Side Dr., Millersville, PA (US) 17551

(*) Notice: Subject to any disclaimer, the term of this patent is extended or adjusted under 35 U.S.C. 154(b) by 0 days.

(21) Appl. No.: 10/217,214

(22) Filed: Aug. 12, 2002

(65) Prior Publication Data

US 2003/0034277 A1 Feb. 20, 2003

Related U.S. Application Data

(60) Provisional application No. 60/312,967, filed on Aug. 16, 2001.

(51) Int. Cl.$^7$ .............................. B07B 4/04; B07B 7/04
(52) U.S. Cl. ......................... 209/149; 209/39; 209/137; 209/145
(58) Field of Search ............................... 209/133, 145, 209/149, 136, 137, 39

(56) References Cited

U.S. PATENT DOCUMENTS

| | | | | |
|---|---|---|---|---|
| 2,051,570 A | * | 8/1936 | Norton et al. | 209/137 |
| 2,214,434 A | * | 9/1940 | Nelms | 209/135 |
| 2,973,862 A | * | 3/1961 | Vail | 209/136 |
| 3,111,483 A | * | 11/1963 | Kibsgaard | 209/10 |
| 3,542,037 A | * | 11/1970 | Pietralunga | 131/109.2 |
| 3,669,264 A | * | 6/1972 | Bryant | 209/138 |
| 4,089,422 A | * | 5/1978 | Harmke et al. | 209/137 |
| 4,379,748 A | * | 4/1983 | Hoogendoorn | 209/11 |
| 4,461,700 A | * | 7/1984 | Lahtinen | 209/136 |
| 4,631,124 A | * | 12/1986 | Paulson | 209/3 |
| 4,737,269 A | * | 4/1988 | Bischoff | 209/23 |
| 4,772,381 A | * | 9/1988 | Julius | 209/39 |
| 4,915,824 A | * | 4/1990 | Surtees | 209/139.1 |
| 5,035,331 A | * | 7/1991 | Paulson | 209/3 |
| 5,251,763 A | * | 10/1993 | Morris | 209/136 |
| 5,427,248 A | * | 6/1995 | Levy et al. | 209/137 |
| 5,437,373 A | * | 8/1995 | Desmadryl | 209/137 |
| 5,685,434 A | * | 11/1997 | Ackerman | 209/135 |
| 5,912,038 A | * | 6/1999 | Gruenwald | |

FOREIGN PATENT DOCUMENTS

FR 884549 * 4/1943 ................. 209/145

* cited by examiner

Primary Examiner—Donald P. Walsh
Assistant Examiner—Daniel K Schlak
(74) Attorney, Agent, or Firm—Miller Law Group, PLLC (57) ABSTRACT

A compact dedusting apparatus is mounted on the machine utilizing particulate material requiring contaminant cleansing to provide an economical and effective decontamination of particulate material immediately before utilization of the material. The dedusting apparatus includes a downwardly sloped infeed chute having an opening at the bottom thereof. A metering device in the form of a rotatable finned hub blocks the opening to constantly meter the flow of particulate material through the dedusting apparatus. The metering device is formed with flexible blades oriented at a slight angle to the slope of the infeed chute to provide a constant flow of material through the opening. A flow of air is directed through a wash deck positioned below the infeed chute to cleanse the particulate material. The air flow is directed along multiple paths including a path defining an air knife associated with the wash deck to facilitate the cleansing of the material.

15 Claims, 14 Drawing Sheets

Fig. 14F ical Patent Application Serial No. 60/312,967, filed Aug.
PARTICULATE MATERIAL DEDUSTING APPARATUS

CROSS-REFERENCE TO RELATED APPLICATIONS

This application claims domestic priority on U.S. Provisional Patent Application Serial No. 60/312,967, filed Aug. 16, 2001, the contents of which are incorporated herein by reference.

BACKGROUND OF THE INVENTION

The invention disclosed in this application is directed generally to the cleaning and handling of particulate materials, such as plastic pellets, grains, glass, and the like, and particularly to the cleaning of particulate injection moldable materials as close to the actual molding process step as possible to significantly reduce contaminants.

It is well known, particularly in the field of transporting and using particulate materials, commonly powders, granules, pellets, and the like that it is important to keep product particles as free as possible of contaminants. Particulates are usually transported within a facility where they are to be mixed, packaged or used in a pressurized tubular system that in reality produces a stream of material that behaves somewhat like a fluid. As these materials move through the pipes, considerable friction is generated not only among the particles themselves, but also between the tube walls and the particles in the stream. In turn, this friction results in the development of particle dust, broken particles, fluff, and streamers (ribbon-like elements that can "grow" into quite long and tangled wads that will impede the flow of materials or even totally block the flow). The characteristics of such a transport system are quite well known, as is the importance and value of keeping product particles as free as possible of contaminants.

The term "contaminant" as used herein includes a broad range of foreign material as well as the broken particles, dust, fluff and streamers mentioned in the preceding paragraph. In any case, contaminants are detrimental to the production of a high quality product, and in some situations a health risk to employees of the producer and possibly even a source of danger in that some contaminants can produce a dust cloud which, if exposed to an ignition source, may explode.

Considering product quality, and focusing on moldable plastics as a primary example, foreign material different in composition from the primary material, such as dust, non-uniform material of the primary product, fluff, and streamers, does not necessarily have the same melting temperatures as the primary product and causes flaws when the material is melted and molded. These flaws result in finished products that are not uniform in color, may contain bubbles, and often appear to be blemished or stained, and are, therefore, unsellable. It is important to note that since these same non-uniform materials often do not melt at the same temperature as the primary product, the unmelted contaminants cause friction and premature wear to the molding machines, resulting in downtime, lost production, reduced productivity, increased maintenance and thus increased overall production costs.

Since dust and other contaminants are generated mostly by the transport system, it is of primary importance to not only provide apparatus for thoroughly cleaning the particles, but to do so as close to the point of use of the particles as possible so as to avoid the generation of contaminants through additional transport. Dedusters have been used for several years to clean materials in this application; however, the instant invention provides a large improvement over the prior art. Applicants identified the need for a smaller more compact deduster, capable of handling smaller volumes of product, yet also capable of thoroughly cleaning the product. Importantly, that the instant invention significantly reduces size and costs over prior similar machines and permits installation in the material handling process immediately before final use of the products rather than at an earlier stage after which re-contamination can occur.

In the past, larger dedusters were used to clean product that was then stored in bulk for later use in molding. The stored material was then often sent through a dryer to eliminate moisture just before injection molding. Moisture on the plastic pellets becomes steam in the molding machine, resulting in bubbles or discoloration in the final product. The more significant problem faced under the old system was that after cleaning and bulk storage, the particles had to be transported to the dryer, creating new dust and picking up new contaminants inherent in transport-so when the product reached the dryer, the dust and other contaminants would be "baked" on the pellets due to the high temperatures required for drying. Such problems make evident the value of cleaning just prior to drying and molding. With this new design, manufacturers will experience reduced scrap, improved end product quality, decreased maintenance on machinery, increased productivity, and short investment paybacks.

SUMMARY OF THE INVENTION

It is an object of the invention to overcome the disadvantages of the prior art by providing a compact dedusting apparatus that is capable of handling volumes of particulate material for feeding to a molding machine, while thoroughly cleaning the material before being used by the machine.

It is another object of this invention to provide an effective compact dedusting apparatus that can be thoroughly clean a flow of particulate material of dust particles and other contaminants immediately prior to the particulate material being used.

It is an advantage of this invention that the particulate material is not subjected to subsequent contamination after being cleaned through storage and handling operations.

It is a feature of this invention that the compact deduster can be mounted on a plastic molding machine to cleanse plastic pellets of contaminants as the pellets are being fed into the molding machine.

It is still another object of this invention to provide a metering apparatus that is effective to constantly meter the flow of particulate material through the dedusting apparatus.

It is another feature of this invention that the metering apparatus is formed as a rotatable finned hub that blocks an opening through the dedusting apparatus to control the flow of particulate material through the opening.

It is still another feature of this invention that the finned hub is rotated at approximately one revolution per minute.

It is another advantage of this invention that the finned hub utilized flexible blades that will deflect when encountering a material clog to maintain a uniform constant flow of particulate material through the deduster apparatus.

It is yet another object of this invention to connect the dedusting apparatus to a remote dust collector apparatus that provides a flow of clean air through the dedusting apparatus.

It is yet another feature of this invention that the air flow through the dedusting apparatus is directed in multiple paths, including a path that creates an air knife to help dislodge contaminants from the particulate material being cleansed by the deduster apparatus.

It is a further feature of this invention that the infeed device directing particulate material through the dedusting apparatus is formed as an angled chute with an opening at the lower portions of the chute to direct the flow of particulate material through the dedusting apparatus.

It is still another advantage of this invention that the metering device is rotatably mounted at a position over the opening at the bottom of the infeed chute directing the flow of particulate material through the dedusting apparatus.

It is still a further feature of this invention that the angle of the blades on the finned hub is oriented at an angle to the slope of the infeed chute to facilitate the flow of particulate material into the opening in the infeed chute.

It is yet another advantage of this invention that a magnetic flux field can be utilized to disrupt the electrostatic bond between the particulate material and the contaminants clinging thereto.

It is a further object of this invention to provide a compact dedusting apparatus that is durable in construction, inexpensive of manufacture, carefree of maintenance, facile in assemblage, and simple and effective in use.

These and other objects, features and advantages are accomplished according to the instant invention by providing a compact dedusting apparatus that can be mounted on the machine utilizing particulate material requiring contaminant cleansing to provide an economical and effective decontamination of particulate material immediately before utilization of the material. The dedusting apparatus includes a downwardly sloped infeed chute having an opening at the bottom thereof. A metering device in the form of a rotatable finned hub blocks the opening to constantly meter the flow of particulate material through the dedusting apparatus. The metering device is formed with flexible blades oriented at a slight angle to the slope of the infeed chute to provide a constant flow of material through the opening. A flow of air is directed through a wash deck positioned below the infeed chute to cleanse the particulate material. The air flow is directed along multiple paths including a path defining an air knife associated with the wash deck to facilitate the cleansing of the material. After passing through the dedusting apparatus, the particulate material is fed directly to the machine utilizing the material.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
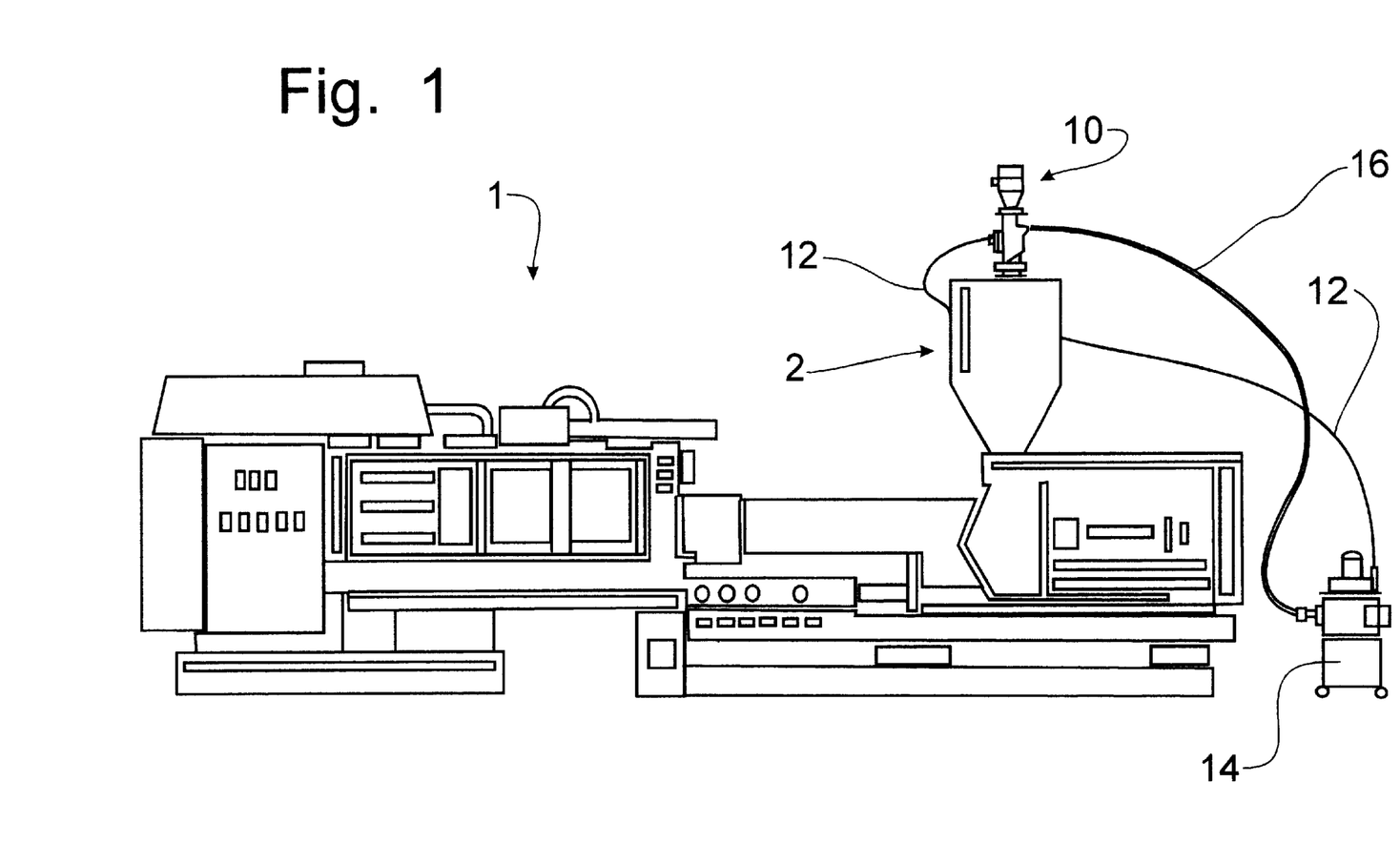
FIG. 1 is an elevational view of an injection molding machine having a dedusting apparatus incorporating the principles of the instant invention operably mounted on the feed hopper to remove dust particles from the particulate material being fed into the hopper.

Referring to FIG. 1, a practical application of the deduster of the instant invention can be seen. An injection molding machine 1 has a feed hopper 2 at the input into which is fed a controlled amount of raw material in the form of plastic pellets. The molding machine may be of any form or type, and is not part of the instant invention. Generally depicted affixed to hopper 2 is the deduster 10 of the instant invention through which the plastic pellets must pass on their way to hopper 2. The embodiment of the instant invention shown here is intended to be part of a closed loop air circulation system, so there is a hose 12 feeding clean air to the deduster from the dust collector 14, and a return hose 16 directing contaminated air from the deduster to the dust collector. The dust collector creates a vacuum in the return hose 16. The instant invention permits the development of a deduster that is much smaller in physical size than ever before possible, and thus the insertion of such device in a location in the overall molding process that is immediately at the molding machine input. In this way, contaminants are substantially eliminated, saving considerable losses, reducing wear within the molding machine itself and reducing maintenance costs, and providing for the production of a more consistent looking and salable final product.

Figure 2:
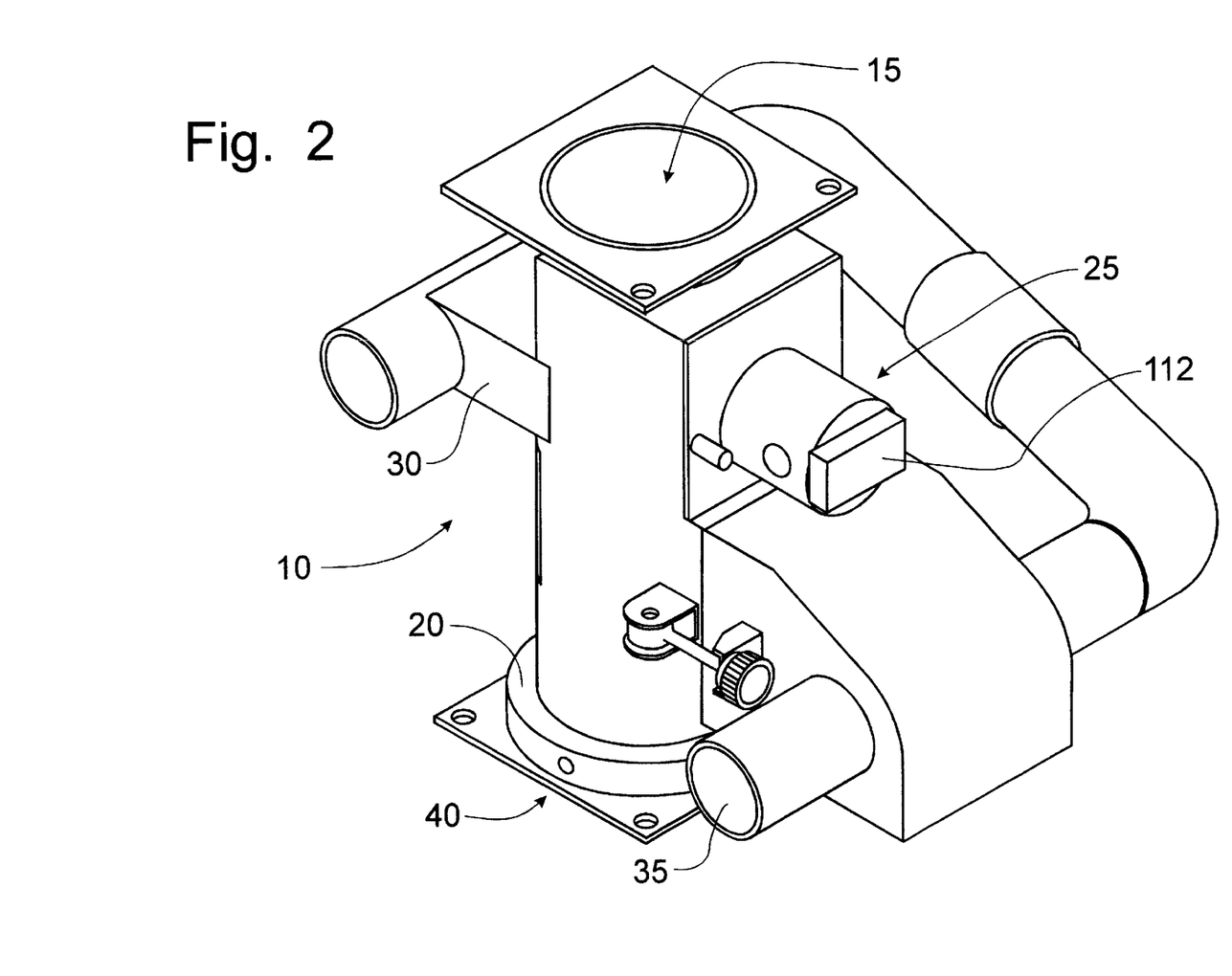
FIG. 2 is a right, front perspective view of a first embodiment of a deduster incorporating the principles of the instant invention.

For purposes of explanation, FIG. 2 is provided as a simplified perspective of a first embodiment of the overall machine 10 of the instant invention, though it should be noted that the embodiment shown in FIG. 2 is somewhat different from that shown in the remainder of the drawings (however, there is no significant difference between the embodiments shown). Product (in this example, plastic pellets plus the usual contaminants associated therewith) is fed into inlet 15 where it enters a flux field generated by the primary magnetic flux field generator 20. As more fully explained in earlier U.S. Pat. No. 5,035,331, issued on Jul. 30, 1991, which is incorporated herein in its entirety by reference, this magnetic flux field disrupts the electrostatic bond between dust and pellets.

The product then encounters agitator 25 that drops the pellets in a measured, consistent flow onto a wash deck where they are fluidized by wash air that lifts the lighter contaminants above the main product stream. The pellets then pass through a venturi chamber that regulates updraft air velocity, via an air knife (to be discussed further below), to a sufficient level to remove even difficult contaminants. The dust, fluff and streamers are carried out of the deduster through air outlet 30. The air is filtered at the air inlet 35 and either recirculated to the wash deck through a dust collector, or discharged to the atmosphere. The cleaned pellets are then discharged through outlet 40 at the base of the unit 10 and into the utilization process, in this example, a plastic molding machine, as depicted in FIG. 1.

The flux field serves to disrupt the static charge attraction of dust and other contaminants adhering to the primary particulate product, thereby allowing this unwanted material to be separated and removed from the product flow path. The magnetic field is varied in strength and frequency to vary the level and intensity of the flux field in order to more effectively cause separation of the contaminants and the primary product. Primary separation is achieved by airflow through the product by means of a perforated screen or wash deck to both remove the unwanted material from the flow path and to accelerate the primary product along that path. Prior art machines generally required multiple wash decks to achieve acceptable levels of product cleaning. Due to the ergonomic design and unique utilization of the instant invention it accomplishes acceptable levels of product cleaning with a single deck. A venturi zone creates high relative velocity counter-airflow to more effectively promote separation of the contaminants. Secondary cleaning and magnetic fields can also be provided. The discharged air is treated to trap the removed contaminants, preventing it from returning into the flow path. The subject apparatus preferably has a slight negative internal pressure to assure collection of the separated contaminants.

The magnetic flux generator 20 is not necessary in every application. If the dust particles to be removed are less than 100 microns in diameter, the generator should be used; however, for removal of dust particles greater than 100 microns in diameter, a magnetic flux generator 20 may not be necessary or essential.

Figure 3:
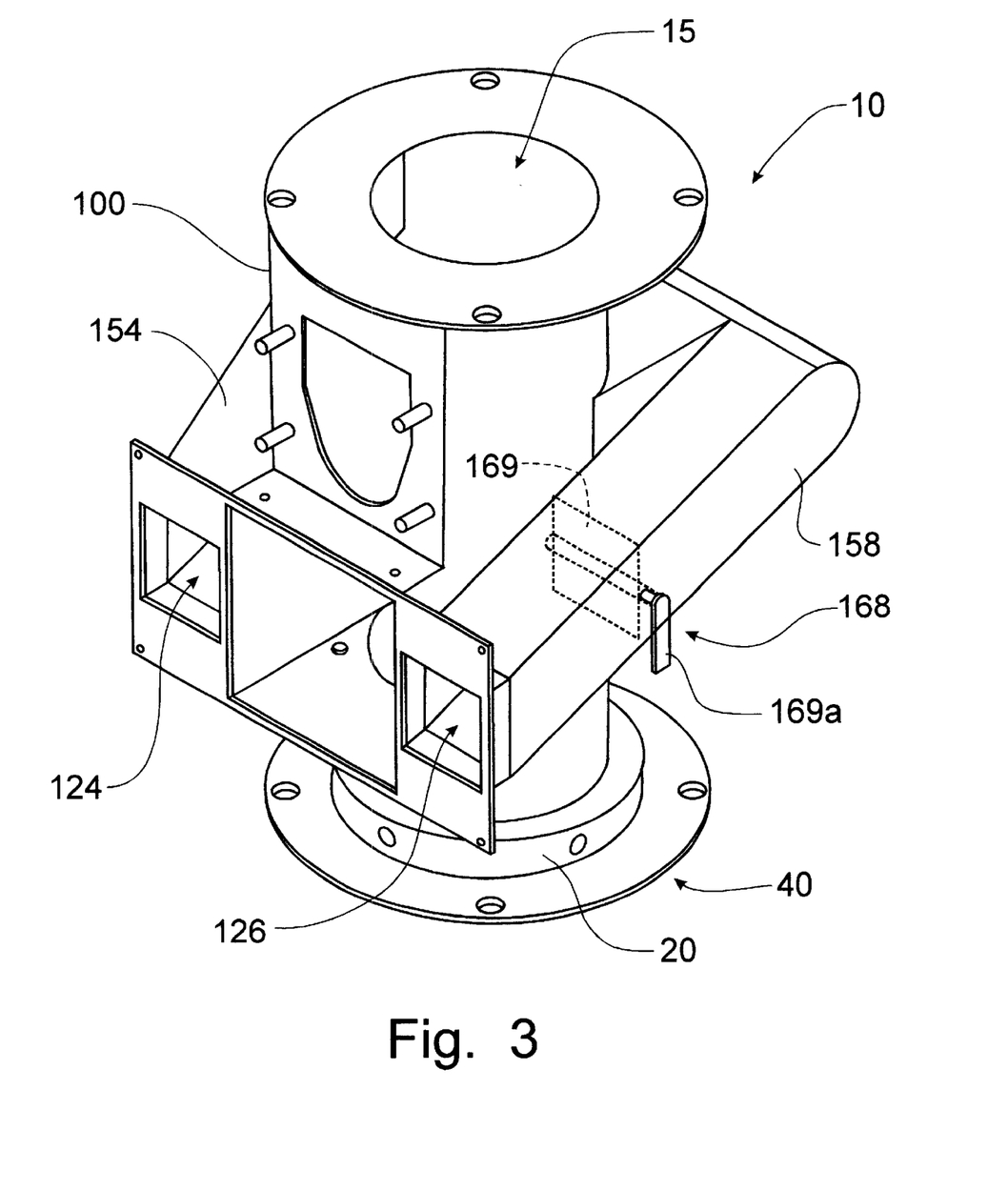
FIG. 3 is a left, front perspective view of a second embodiment of a deduster incorporating the principles of the instant invention.
Figure 4:
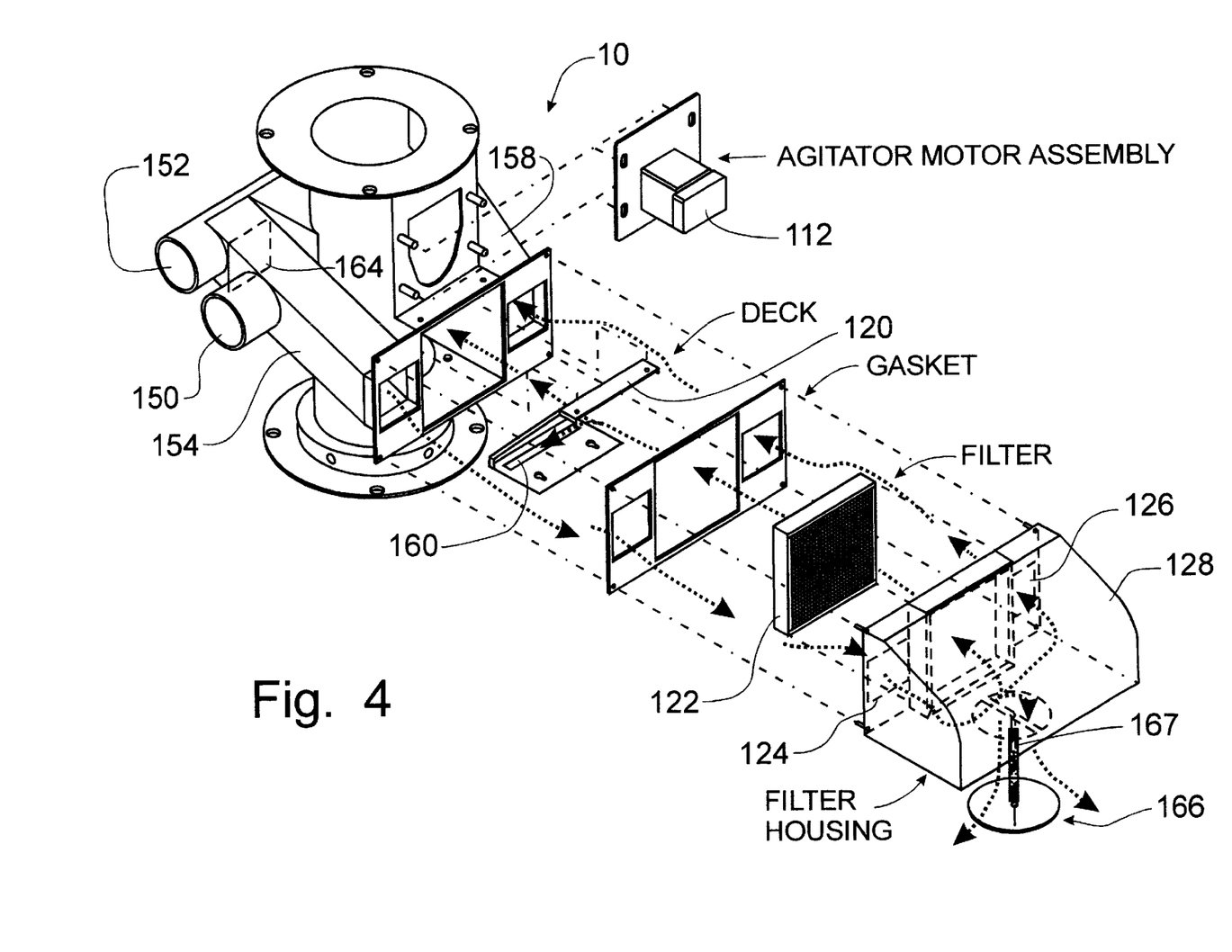
FIG. 4 is an exploded right, front perspective view of the second embodiment of the deduster depicted in FIG. 3.
Figure 5:
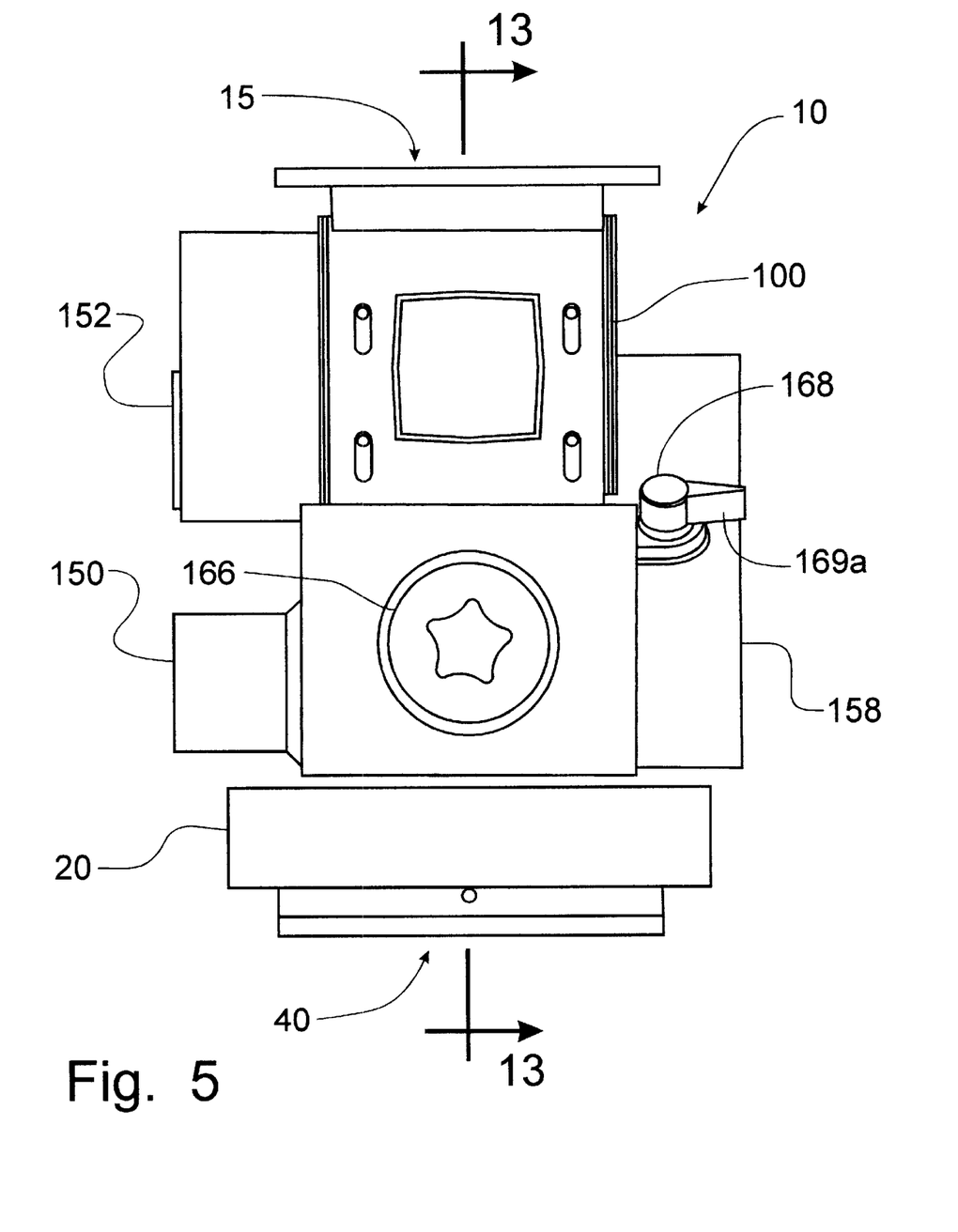
FIG. 5 is a front elevational view of a third embodiment of a deduster incorporating the principles of the instant invention.
Figure 6:
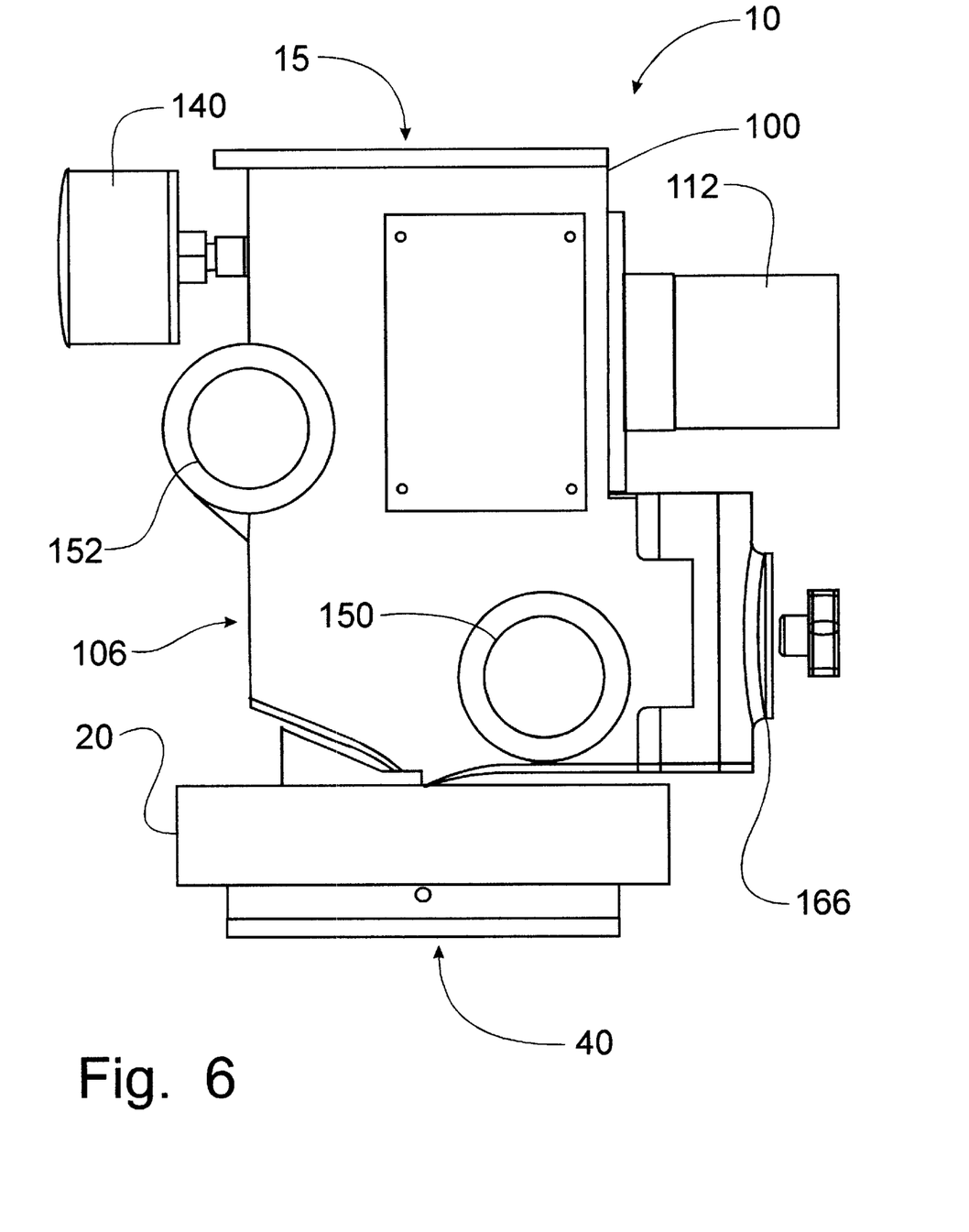
FIG. 6 is a right side elevational view of the third embodiment of the deduster shown in FIG. 5.
Figure 7:
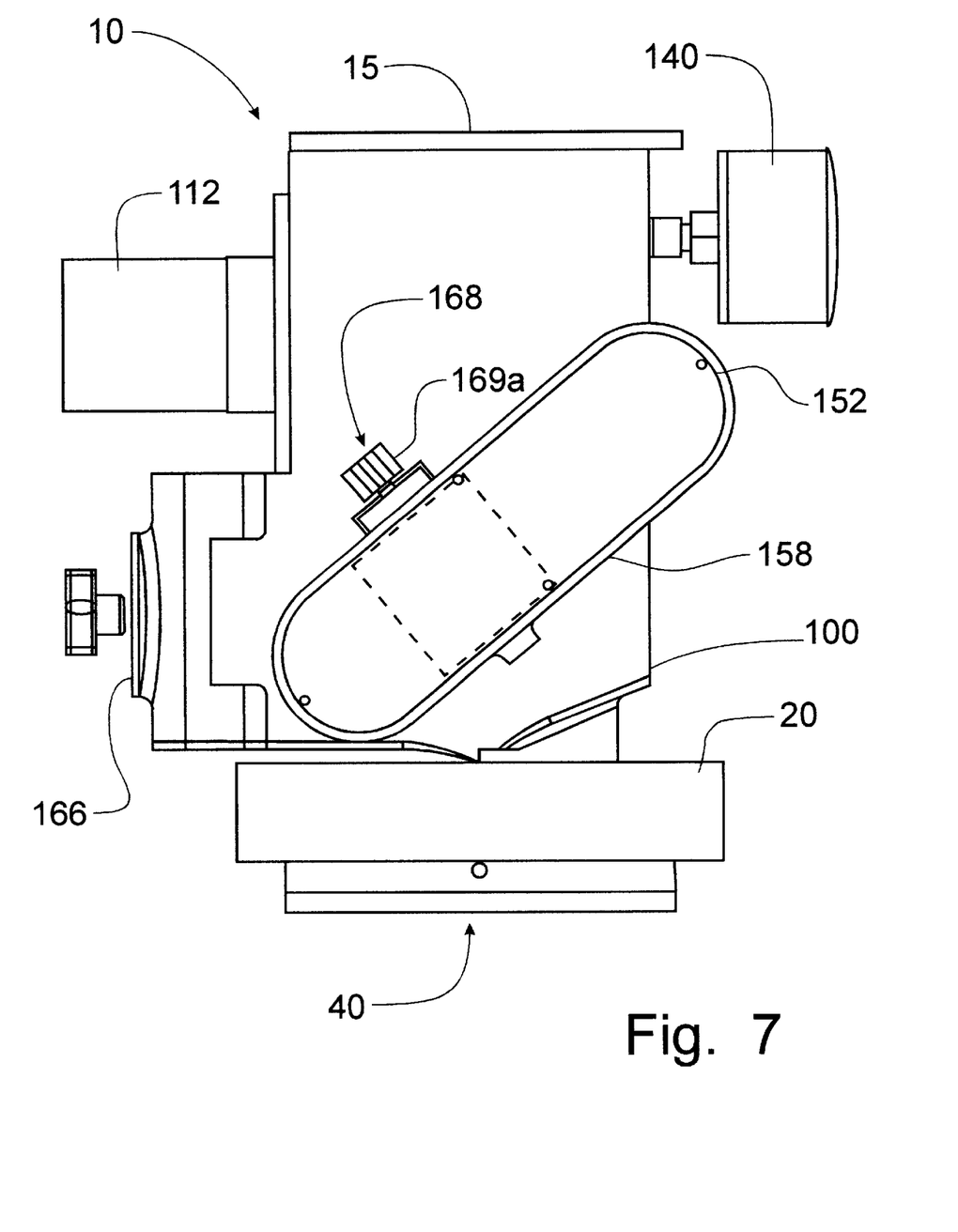
FIG. 7 is a left side elevational view of the third embodiment of the deduster shown in FIG. 5.
Figure 8:
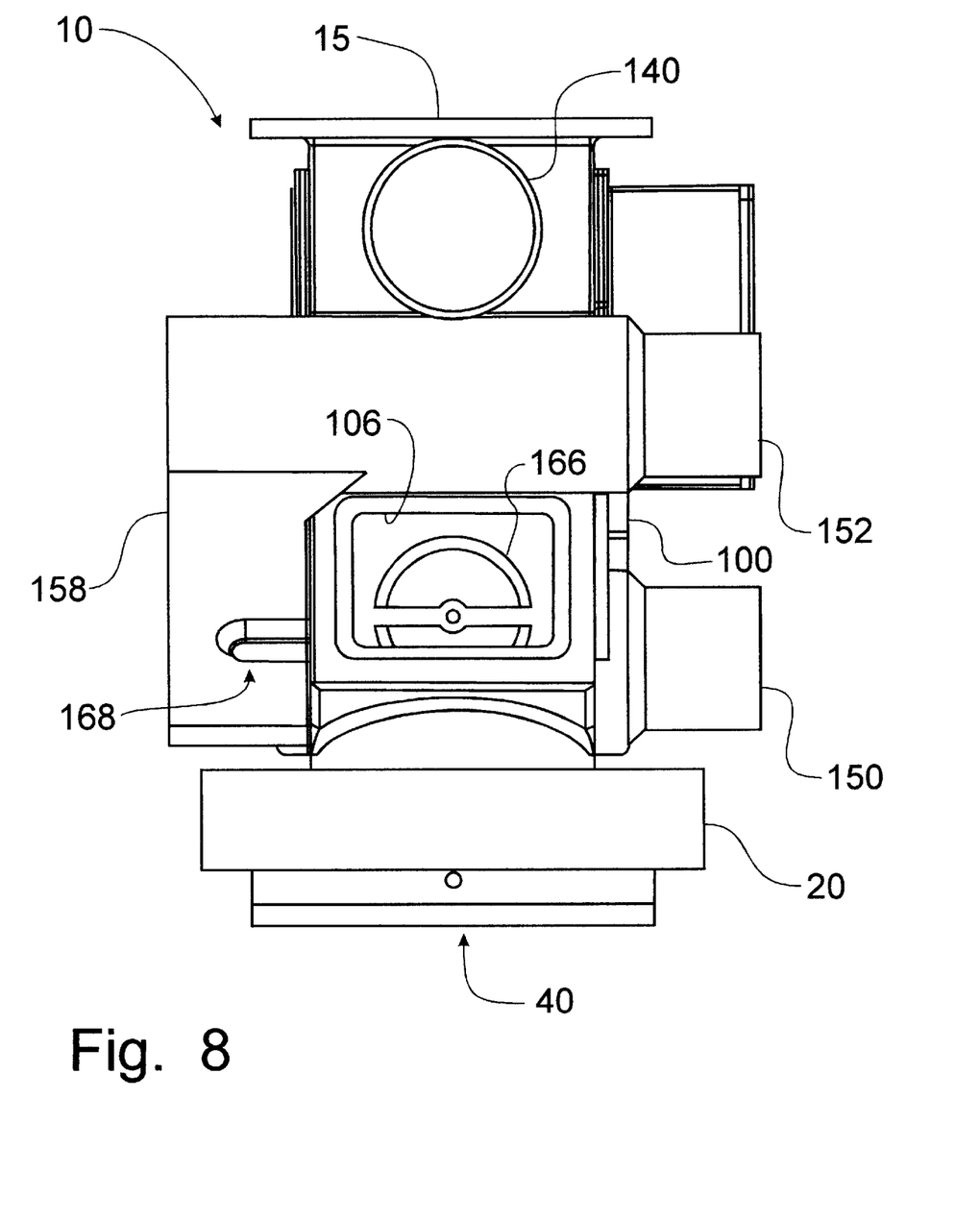
FIG. 8 is a rear elevational view of the deduster depicted in FIG. 5.
Figure 9:
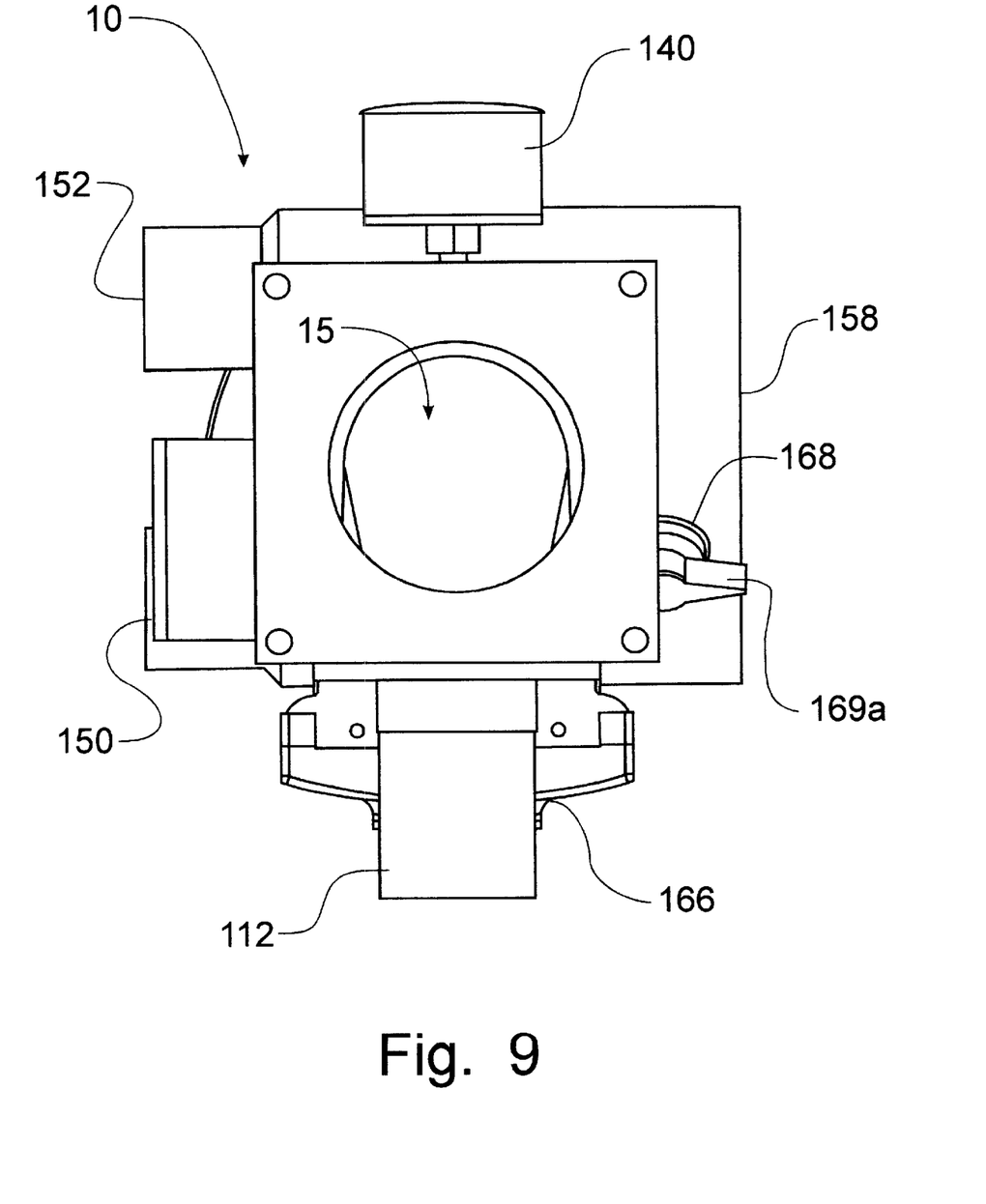
FIG. 9 is a top plan view of the deduster depicted in FIG. 5.
Figure 10:
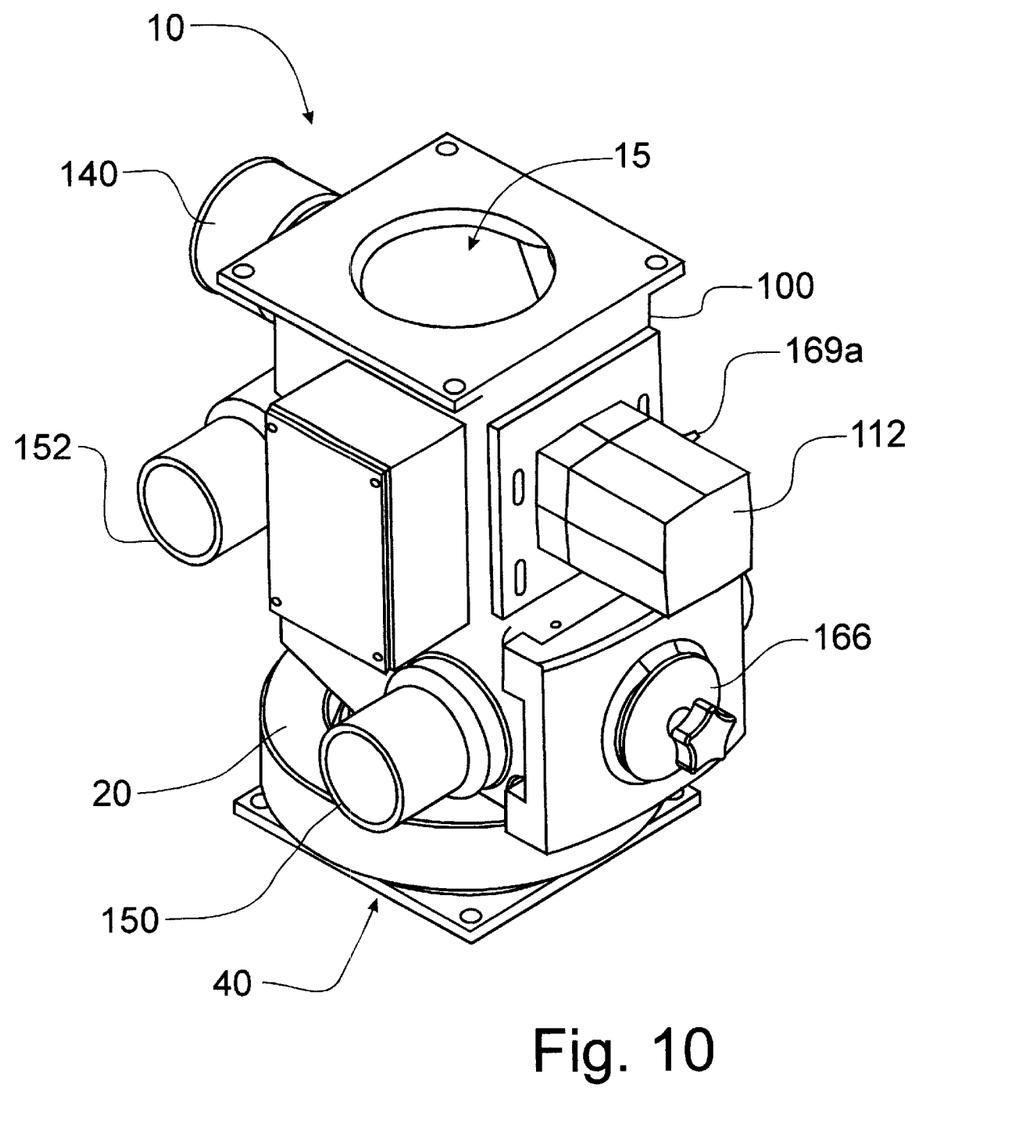
FIG. 10 is a right front perspective view of the third embodiment of the deduster shown in FIGS. 5–9.

Referring now to FIGS. 3 and 4, a second embodiment of the deduster can best be seen. One of ordinary skill in the fabrication arts will readily recognize that the deduster 10 can be constructed in many different ways from many different materials. The construction variables are generally not part of this invention, and the structure actually described should be taken as but a single example of how one can build such an apparatus that will be fully functional. More specifically, the components, assembly and subassemblies can be made from steel or plastic and other similar materials, and may be fabricated, cast or molded. Casting the housing 100 in aluminum or, for installations requiring high quality operations, in stainless steel has proven to be an economical alternative to fabricating the housing 100 from sheet metal which has been bent and welded into shape. The housing 100 is a single assembly that can be comprised primarily of subassemblies fabricated from steel sheeting and tubes. While the fabrication of the subassemblies and housing assembly will be clear to one of ordinary skill in the art from these figures, there are a few elements and structural components that should be described in more detail.

Figure 15:
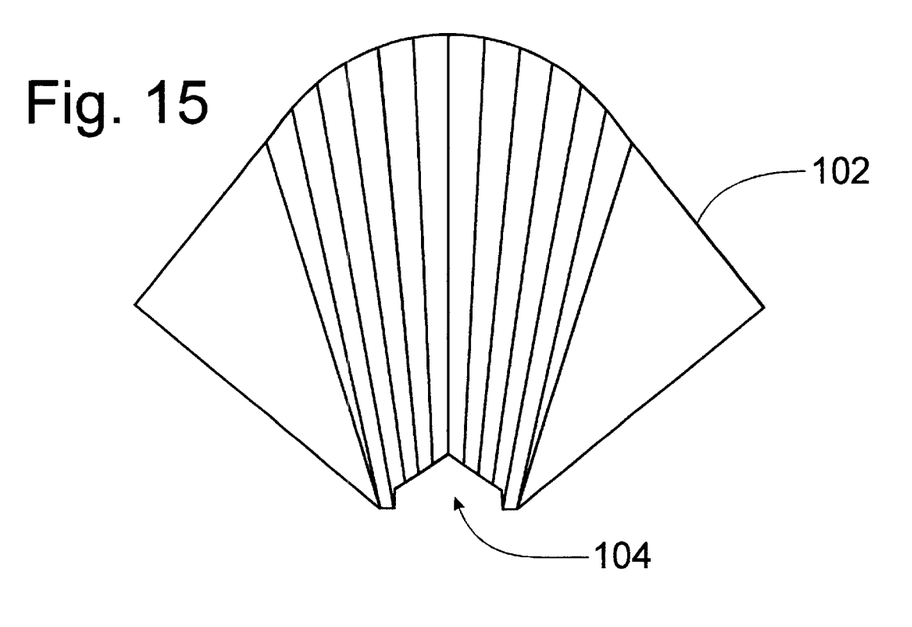
FIG. 15 is an enlarged detail view of the chute member cooperatively positioned beneath the agitator to guide particulate material to the agitator for feeding into the deduster.

A third embodiment of the instant invention can be seen in FIGS. 5–13. While the configuration of the structural components of the deduster 10 vary between the embodiments disclosed in FIGS. 2–13, the general operation of the deduster 10 is substantially the same. Particulate material, such as plastic pellets, contaminated with dust or other associated contaminants, are fed into the deduster 10 through top opening 15. The system and controls for feeding the pellets from bulk storage is known in the art and will not be described herein. The pellets fall onto chute 102 that is angularly fixed to feed the pellets from the rear toward a feeding and regulating device 25, to be described in greater detail below, called an agitator. The chute 102, importantly, is shaped to have an opening therein 104 with a curved lower portion, best seen in FIG. 15. A sight window 106, seen best in FIGS. 8 and 11–13, is positioned at the rear of the deduster 10 to allow an operator to view the operation of the wash deck 120 and judge the overall operation of the deduster 10.

Figure 11:
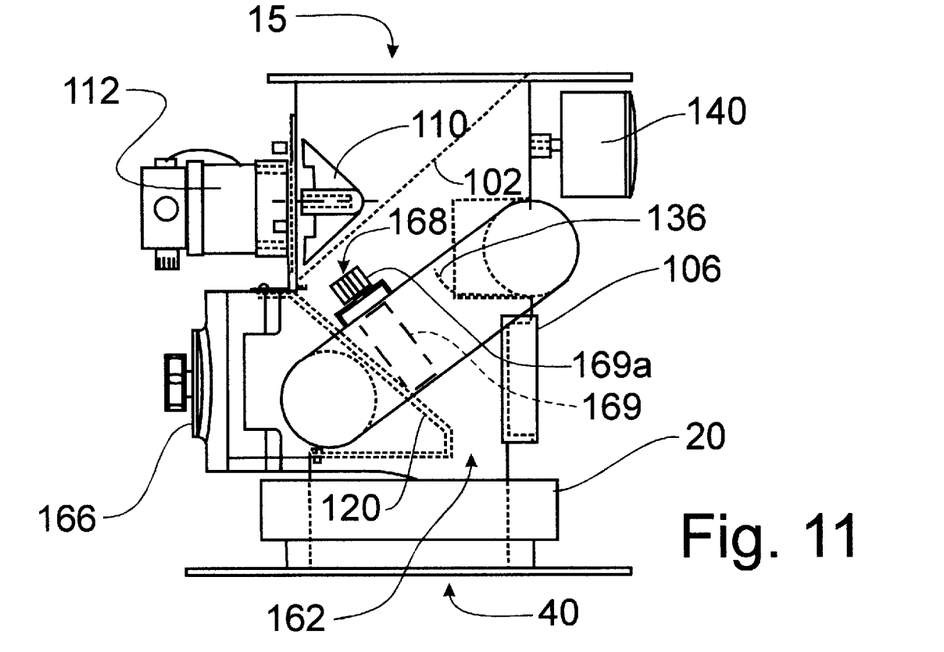
FIG. 11 is a left side elevational view of the deduster similar to that shown in FIG. 7, but depicting internal structure of the deduster.
Figure 12:
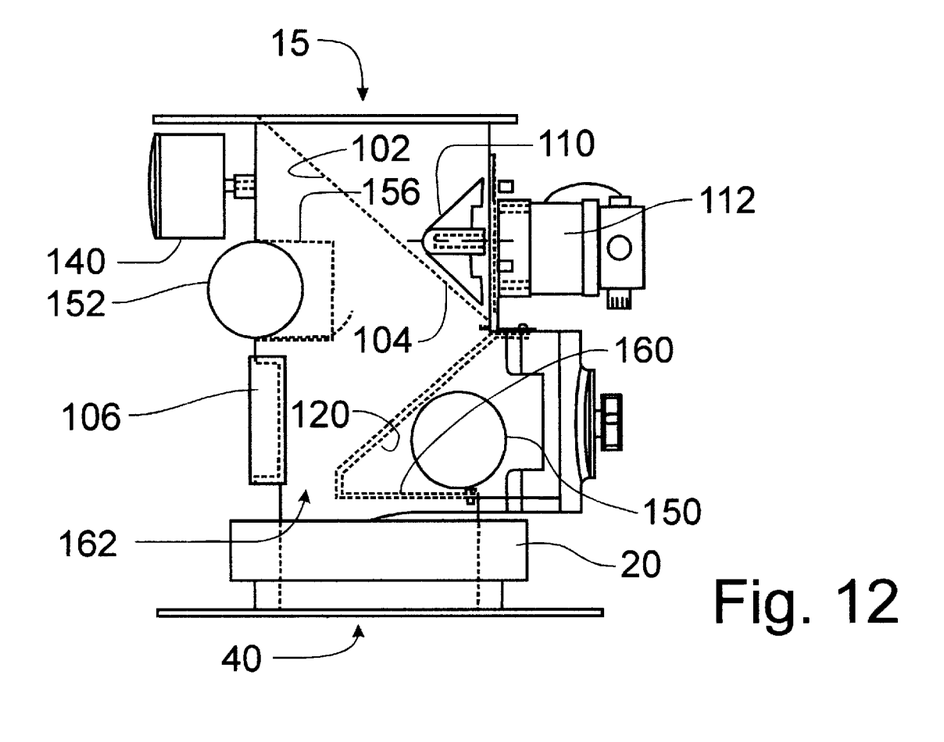
FIG. 12 is a right side elevational view of the deduster similar to that shown in FIG. 6, but depicting internal structure of the deduster.
Figure 13:
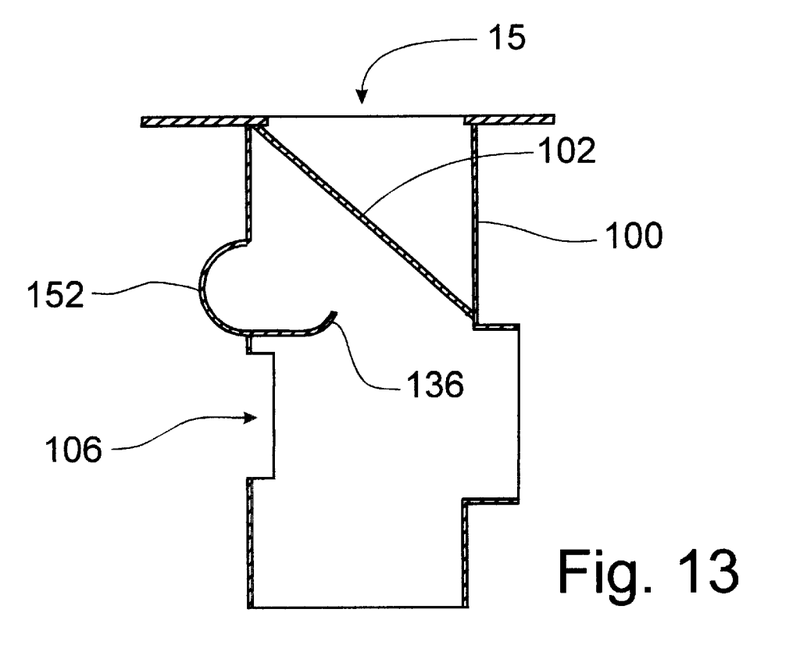
FIG. 13 is a cross-sectional view of the housing taken along lines 13—13 in FIG. 5.
Figure 14A:
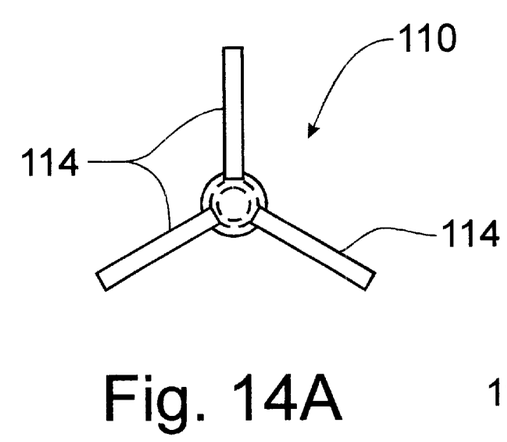
FIG. 14A is an enlarged end elevational view of a first embodiment of the agitator member.
Figure 14B:
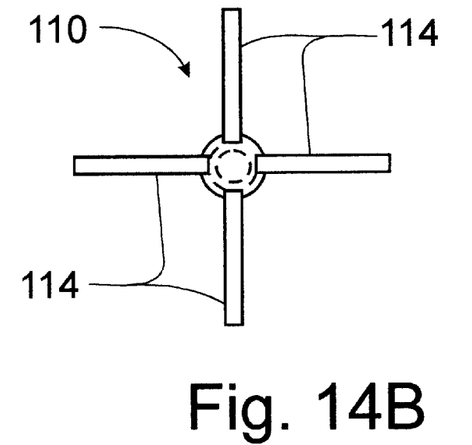
FIG. 14B is an enlarged end elevational view of a second embodiment of the agitator member.
Figure 14C:
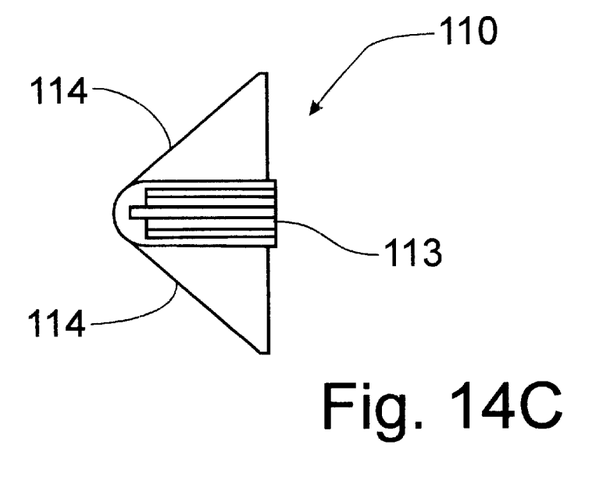
FIG. 14C is a side elevational view of the agitator member orthogonal to the view of FIG. 14B.

Referring now to FIGS. 11 through 12, additional details of the invention will be described. Particulate material to be cleaned is fed through the top opening 15 and onto chute 102 where they feed angularly and downwardly toward the bottom of opening 104. As can perhaps be seen best in FIGS. 11 and 12, an agitator rotor 110, mounted to motor 112, extends into the opening 104 and generally blocks the opening 104 with respect to the flow of the material. FIGS. 14A through 14F show the structure of the rotor 110 as being formed as a metal hub 113 with reverse threads and flexible blades 114 adhered thereto. The blades 114, when rotated by motor 112, feed a measured amount of material through the opening. The number of blades 114, and, therefore, the configuration of the metal hub 113, can vary, as depicted in FIGS. 14E and 14F, depending upon the size and type of pellets being fed; however, for most situations three blades have been found to be acceptable and provide satisfactory results.

A critical component of this structure is the use of flexible material for the blades 114. If the blades 114 are rigid, it has been found that the pellets tend to clog and jam the opening 104 and/or between the blades 114 and the chute 102, resulting in an interruption of the flow of pellets to the wash deck 120 and in a breakage of the pellets. On the other hand, flexible blades 114 provide a continuous measured flow with no breakage or interruption. If a blockage is encountered, the blades 114 flex and thus pass enough material into the opening 104 to automatically and quickly restart the desired flow. The flexible material used for the blades 114 must be flexible enough to deflect when an obstruction is encountered, yet rigid enough to last a reasonable period of time. Polyurethane has been found to be a very acceptable material.

Figure 14D:
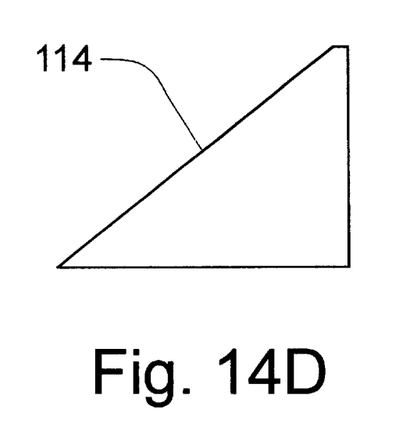
FIG. 14D is a detail view of a fin forming part of the agitator member shown in FIGS. 14A and 14B.
Figure 14E:
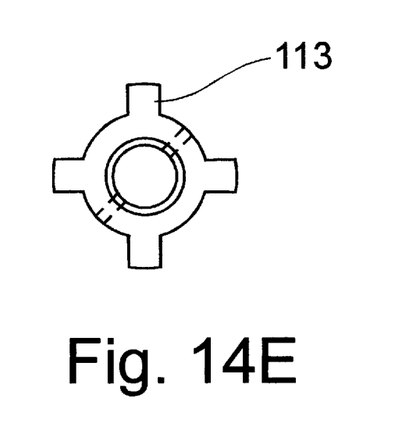
FIG. 14E is an enlarged elevational detail view of the hub forming the central part of the agitator to which the fins of FIG. 14D are mounted to form the second embodiment of the agitator.
Figure 14F:
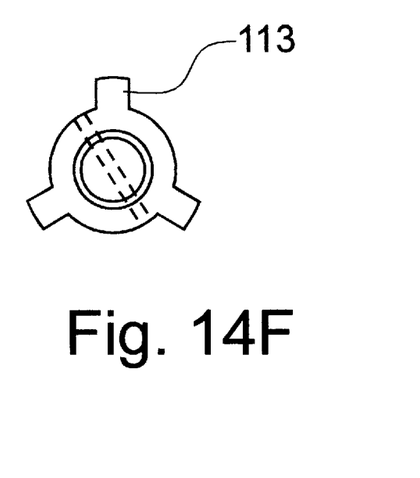
FIG. 14F is an enlarged detail view similar to that of FIG. 14E, except corresponding to the first embodiment of the agitator shown in FIG. 14A.
Figure 14G:
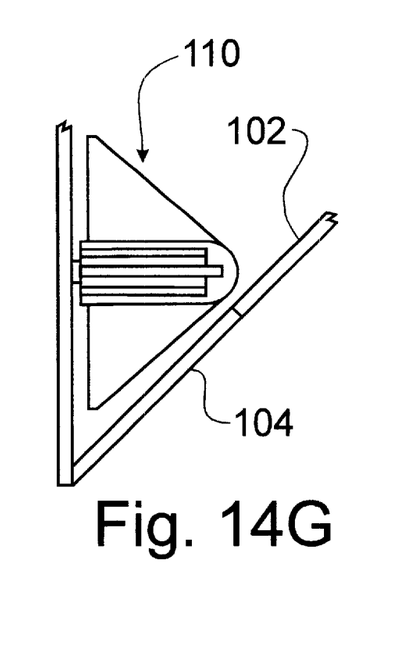
FIG. 14G is an elevational detail view of a portion of the deduster depicting the mounting of the agitator.

The angle of the blades 114, i.e., the angle between the flight with the hub as seen in FIG. 14D (the acute angle to the left in FIG. 14D) is different than the angle of the chute 102, as seen best in FIG. 14G. This relationship, which can vary with the size of pellets being fed, tends to "walk"

pellets that are caught down the flight toward opening 104. The motor 112 is set to operate at about one revolution per minute, though can be modified, or made variable, depending upon the parameters mentioned above. The blades 114 are triangular-shaped to fit the opening 104.

Immediately below the opening 106 is the wash deck 120 that is also an angled surface running from just below the rotor 110 downwardly toward the circular output 40. Though designs corresponding to operation with different particulate materials or pellets may differ, the concept of an air wash deck 120 is known in the art and shown, for example, in U.S. Pat. No. 4,631,124. In general, however, wash deck 120 is a flat sieve-like member with holes or slots therein to allow air to flow through as part of the cleaning process. It has been found that the air is passed through and is properly directed by using a perforated directed material for the screen—the perforations are "louvered" to give better directional air flow. As best seen in FIG. 3, an optional air filter 122 can be located within the air flow immediately adjacent the wash deck 120. In this second embodiment, a closed air inlet fixture 128 can be added that includes inlet and outlet openings 124 and 126 to direct the air flow through the deduster 10 in the desired manner.

Referring primarily to FIGS. 5–13, a vacuum draws air through the wash deck 120 via the return hose 16 interconnecting the outlet 152 and the dust collector 14. A curved baffle 136, best seen in FIGS. 11–13, helps prevent the pellets themselves from being pulled through the outlet tube 152. A pressure gauge 140 may be conveniently added to provide a visual representation of the pressure in the deduster 10.

For improved clarity, particular reference is made to FIGS. 11 and 12. Clean air from the dust collector is drawn into the inlet 150, from which the air may flow along three different paths: (1) directly through the wash deck 120 (and through a filter if provided), and then through outlet stub 156 to outlet 152 back to the dust collector for cleaning; (2) directly across the housing 100 to the return conduit 158 and back to the dust collector via outlet 152; or (3) through the slot 160 below wash deck 120, up into the semi-circular venturi chamber 162 and eventually out through outlet 152. In the second embodiment shown in FIGS. 3 and 4, the inlet and outlet 150, 152 are completely separated by a fixed closure 164; however, in the preferred third embodiment, the inlet and outlet are not structurally joined except via the paths defined above. A pressure relief valve 166, that is adjustable by manual movement of a thumbscrew working against a spring representatively shown at 167, will provide a relief against excessive pressures. In the second embodiment shown in FIGS. 3 and 4, the relief valve 166 is incorporated into the closed air inlet fixture 128. In the preferred embodiment of FIGS. 5–13, the pressure relief valve 166 is mounted vertically in the front face of the deduster 10.

An adjustable damper 168 is fitted into outlet conduit 158 to further control the direction of the flow of air through the housing 100. The adjustable damper 168 includes a rotatable baffle 169 mounted within the outlet conduit 158 and connected to an external actuator lever 169a to manually control the orientation of the baffle 169. The actuator lever 169a can be disposed on the side of the return conduit 158, as shown in FIG. 3, or more conveniently placed on top of the return conduit 158, as is depicted in FIGS. 5, 7, 9 and 11. The positional orientation of the baffle 169 varies the amount of air that can be passed through the outlet conduit 158 and, therefore, varies the amount of air passed through the wash deck 120 and the venturi chamber 162. One skilled in the art will recognize that different particulate material, particularly different sized pellets of particulate material will require different air flow rates to provide effective cleansing of the pellets before being fed into the processing machine 1.

In operation, pellets are dropped periodically or constantly depending on the product into opening 15 where they engage chute 102 and are fed to opening 104 and agitator 110. Upon entering the deduster 10, the pellets are subjected to the flux field created by the flux field coil 20, and the powders, dust particles and other contaminants are thereby separated from the pellets. As the rotor 110 turns, pellets are released in a constantly metered flow onto wash deck 120. The constant airflow created by the vacuum in outlet 152 is drawn through the openings in the wash deck 120, fluidizing the stream of pellets and removing the contaminants from the deduster 10.

Within the venturi chamber 162 the air taking what was described above as the third path is adjusted to create an "air knife", i.e., the air flows within the system are adjusted so that the air flow upwardly through venturi chamber 162 almost supports or suspends the pellets falling from the wash deck 120, thus moving the maximum amount of dust and contaminants upwardly to the outlet stub 156. This air adjustment is done by the operator as he views the activity through sight window 106. More specifically, the operator adjusts overall flows, including the damper 168 and valve 166 to control the activity he sees in the window 106. Finally, the pellets fall through the outlet 40 into the molding machine.

The deduster 10 is of such size and construction to handle relatively small volumes of primary product. Generally, volumes less than 500 or 600 pounds per hour make up the best range for this apparatus 10. Other practical applications for this invention will be apparent to one of skill in the art. Wherever it is critical that the primary material be as free from contaminants as possible, this compact deduster will find use.

It will be understood that changes in the details, materials, steps and arrangements of parts, which have been described and illustrated to explain the nature of the invention will occur to and may be made by those skilled in the art upon a reading of this disclosure within the principles of the scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. A dedusting apparatus for removing contaminants from particulate material comprising:

a housing defining a material inlet, a material outlet, an air inlet and an air outlet;

an infeed chute adjoining said material inlet, said infeed chute having a wall to direct material fed into said deduster apparatus toward an opening in said wall;

a conical metering device cooperatively associated with said opening in said infeed chute to control the flow of particulate material through said opening, said metering device providing a substantially constant flow of material through said opening, said metering device being formed with a plurality of generally triangularly-shaped blades mounted on a central hub defining an axis of rotation that is oriented at an acute angle to said infeed chute wall; and a wash deck located in a flow receiving position relative to said opening to receive the flow of particulate material through said opening and remove contaminants from the surface of said particulate material, said wash deck being located along an air flow path extending from said air inlet to said air outlet to utilize said air flow to remove said contaminants to a remote location.

2. The dedusting apparatus of claim 1 wherein said central hub is rotated by a motor at approximately one revolution per minute.

3. The dedusting apparatus of claim 1 wherein said air flow is divided into multiple flow paths by said housing, one of said flow paths being directed through a venturi chamber positioned adjacent said wash deck to form an air knife operable to facilitate the removal of contaminants from said particulate material.

4. The dedusting apparatus of claim 3 wherein said air outlet is provided with a baffle to prevent the discharge of particulate material through said air outlet with said contaminants.

5. The dedusting apparatus of claim 4 wherein an air filter is positioned to filter said air flow prior to being divided into said multiple flow paths.

6. The dedusting apparatus of claim 1 further comprising:
a magnetic flux generator operable to create a flux field to disrupt any electrostatic bond between said contaminants and said particulate material.

7. A compact dedusting apparatus for mounting on a plastic molding machine to cleanse plastic pellets being fed into said plastic molding machine of surface contaminants, comprising:
a housing defining a material inlet, a material outlet, an air inlet and an air outlet;
an infeed chute adjoining said material inlet to direct said plastic pellets toward an opening in said infeed chute;
an agitator cooperatively associated with said opening in said infeed chute to provide a substantially constant flow of plastic pellets through said opening, said agitator is formed with a plurality of generally triangular flexible blades mounted to a central hub for rotation by a motor about an axis defined by said hub;
a wash deck located in a flow receiving position relative to said opening to receive the flow of plastic pellets through said opening and remove said surface contaminants, said wash deck being located along an air flow path extending from said air inlet to said air outlet to utilize said air flow to remove said contaminants to a remote location; and
a magnetic flux generator operable to create a flux field to disrupt any electrostatic bond between said surface contaminants and said plastic pellets.

8. The dedusting apparatus of claim 7 wherein said air flow is divided into multiple flow paths by said housing, one of said flow paths being directed through a venturi chamber positioned adjacent said wash deck to form an air knife operable to facilitate the removal of said surface contaminants from said plastic pellets.

9. The dedusting apparatus of claim 8 wherein said agitator is rotated by said motor at a speed of approximately one revolution per minute.

10. The dedusting apparatus of claim 9 wherein said blades have a diagonally extending side corresponding to a hypotenuse of said triangular shape oriented at an acute angle to said infeed chute.

11. The dedusting apparatus of claim 10 wherein a dust collector is connected remotely to said dedusting apparatus to collect said contaminants discharged through said air outlet, said dust collector providing an air flow through said air inlet.

12. A method of removing surface contaminants from particulate material for use in a processing machine comprising the steps of:
positioning a dedusting apparatus to receive a flow of said particulate material before being fed into said processing machine;
directing said flow of particulate material along a wall of an infeed chute toward an opening;
metering said flow of particulate material to provide a substantially uniform flow of said particulate material through said dedusting apparatus by rotating a conical finned agitator positioned over said opening and having an axis of rotation oriented at an acute angle to said wall to position fins of said agitator for engagement with said particulate material to prevent bridging of said particulate material and to provide a substantially uniform flow of said particulate material through said opening;
washing said substantially uniform flow of said particulate material with an air flow directed through said dedusting apparatus to remove said surface contaminants from said particulate material to create cleansed particulate material;
creating a magnetic flux field to disrupt any electrostatic bond between said surface contaminants and said particulate material prior to or during said washing step;
discharging said air flow having entrained therein said surface contaminants from said dedusting apparatus to a remote collector; and
feeding said cleansed particulate material directly into said processing machine.

13. The method of claim 12 wherein said positioning step comprises the step of mounting said dedusting apparatus directly on said processing machine to intercept said flow of particulate material into said processing machine for cleansing thereof before being utilized thereby.

14. The method of claim 12 wherein said washing step includes the steps of:
positioning a wash deck to receive said substantially uniform flow of particulate material from said finned agitator;
dividing said air flow into multiple air flow paths;
directing a first air flow path through a venturi chamber to create an air knife adjacent said wash deck to slow the flow of said particulate material to facilitate the removal of said surface contaminants; and
directing a second air flow path through said wash deck to entrain said surface contaminants and move said entrained surface contaminants into an air discharge outlet for removal to a remote location.

15. The method of claim 12 further comprising the step of:
creating a magnetic flux field to disrupt any electrostatic bond between said surface contaminants and said particulate material prior to or during said washing step.

* * * * *